United States Patent
DiGiovanni

(10) Patent No.: US 9,868,099 B2
(45) Date of Patent: Jan. 16, 2018

(54) METHODS FOR FORMING POLYCRYSTALLINE MATERIALS INCLUDING PROVIDING MATERIAL WITH SUPERABRASIVE GRAINS PRIOR TO HPHT PROCESSING

(75) Inventor: Anthony A. DiGiovanni, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 670 days.

(21) Appl. No.: 13/091,660

(22) Filed: Apr. 21, 2011

(65) Prior Publication Data

US 2012/0267172 A1    Oct. 25, 2012

(51) Int. Cl.
| | |
|---|---|
| B24D 3/02 | (2006.01) |
| C09C 1/68 | (2006.01) |
| C09K 3/14 | (2006.01) |
| B01J 3/06 | (2006.01) |

(Continued)

(52) U.S. Cl.
CPC ............ *B01J 3/062* (2013.01); *E21B 10/567* (2013.01); *F16C 33/043* (2013.01); *B01J 2203/061* (2013.01); *B01J 2203/062* (2013.01); *B01J 2203/0625* (2013.01);

(Continued)

(58) Field of Classification Search
None
See application file for complete search history.

(56) References Cited

U.S. PATENT DOCUMENTS

| | | | |
|---|---|---|---|
| 4,224,380 A | 9/1980 | Bovenkerk et al. | |
| 4,630,692 A * | 12/1986 | Ecer | B22F 3/15 |
| | | | 175/332 |
| 4,664,705 A | 5/1987 | Horton et al. | |

(Continued)

FOREIGN PATENT DOCUMENTS

| | | |
|---|---|---|
| CN | 1040164 A | 3/1990 |
| CN | 1471567 A | 1/2004 |

(Continued)

OTHER PUBLICATIONS

International Search Report for International Application No. PCT/US2012/034081 dated Nov. 9, 2012, 3 pages.

(Continued)

*Primary Examiner* — Jennifer A Smith
*Assistant Examiner* — Ross J Christie
(74) *Attorney, Agent, or Firm* — TraskBritt

(57) ABSTRACT

Grains of superabrasive material may be infiltrated with a molten metal alloy at a relatively low temperature, and the molten metal alloy may be solidified within interstitial spaces between the grains of superabrasive material to form a solid metal alloy having the grains of superabrasive material embedded therein. The solid metal alloy with the grains of superabrasive material embedded therein may be subjected to a high pressure and high temperature process to form a polycrystalline superabrasive material. A polycrystalline superabrasive material also may be formed by depositing material on surfaces of grains of superabrasive material in a chemical vapor infiltration process to form a porous body, which then may be subjected to a high pressure and high temperature process. Polycrystalline compacts and cutting elements including such compacts may be formed using such methods.

24 Claims, 7 Drawing Sheets

(51) Int. Cl.
*E21B 10/567* (2006.01)
*F16C 33/04* (2006.01)

(52) U.S. Cl.
CPC *B01J 2203/0645* (2013.01); *B01J 2203/0655* (2013.01); *B01J 2203/0685* (2013.01); *F16C 2352/00* (2013.01)

(56) References Cited

U.S. PATENT DOCUMENTS

| | | | |
|---|---|---|---|
| 4,991,467 A * | 2/1991 | Packer | B23B 51/02 408/144 |
| 5,011,514 A * | 4/1991 | Cho et al. | 51/295 |
| 5,127,923 A | 7/1992 | Bunting et al. | |
| 5,151,107 A * | 9/1992 | Cho et al. | 51/295 |
| 5,250,086 A * | 10/1993 | McEachron et al. | 51/309 |
| 5,264,283 A * | 11/1993 | Waldenstrom et al. | 51/307 |
| 5,527,747 A | 6/1996 | Lackey, Jr. et al. | |
| 5,609,955 A | 3/1997 | Pinneo | |
| 5,733,664 A * | 3/1998 | Kelley | B22F 1/0014 428/212 |
| 5,902,675 A | 5/1999 | Pinneo | |
| 5,954,147 A | 9/1999 | Overstreet et al. | |
| 6,203,897 B1 * | 3/2001 | Koizumi et al. | 428/336 |
| 6,214,079 B1 | 4/2001 | Kear et al. | |
| 6,451,249 B1 * | 9/2002 | Koizumi et al. | 419/10 |
| 6,500,557 B1 * | 12/2002 | Koizumi et al. | 428/469 |
| 7,279,023 B2 | 10/2007 | Pickard et al. | |
| 7,350,599 B2 | 4/2008 | Lockwood et al. | |
| 7,510,760 B2 | 3/2009 | Malshe et al. | |
| 7,879,129 B2 | 2/2011 | Kosters et al. | |
| 8,074,748 B1 * | 12/2011 | Miess | C04B 35/52 175/374 |
| 2005/0050801 A1 * | 3/2005 | Cho et al. | 51/293 |
| 2005/0133277 A1 | 6/2005 | Dixon | |
| 2005/0210755 A1 * | 9/2005 | Cho et al. | 51/293 |
| 2005/0230150 A1 * | 10/2005 | Oldham et al. | 175/57 |
| 2008/0057145 A1 | 3/2008 | Hall et al. | |
| 2008/0209818 A1 | 9/2008 | Belnap et al. | |
| 2009/0123648 A1 | 5/2009 | Rowcliffe | |
| 2010/0104874 A1 | 4/2010 | Yong et al. | |
| 2010/0193254 A1 | 8/2010 | Lind et al. | |
| 2010/0206941 A1 * | 8/2010 | Egan | C09K 3/1445 51/295 |
| 2010/0242375 A1 * | 9/2010 | Hall et al. | 51/307 |
| 2010/0282519 A1 * | 11/2010 | Zhang et al. | 175/434 |
| 2010/0320005 A1 * | 12/2010 | Burhan | B22F 7/06 175/426 |
| 2011/0023375 A1 | 2/2011 | Sani et al. | |
| 2011/0023377 A1 | 2/2011 | DiGiovanni | |
| 2011/0030283 A1 * | 2/2011 | Cariveau et al. | 51/297 |
| 2011/0036643 A1 | 2/2011 | Belnap et al. | |
| 2011/0061942 A1 | 3/2011 | DiGiovanni | |
| 2011/0067929 A1 * | 3/2011 | Mukhopadhyay et al. | 51/307 |
| 2011/0073380 A1 | 3/2011 | DiGiovanni | |
| 2011/0083908 A1 | 4/2011 | Shen et al. | |

FOREIGN PATENT DOCUMENTS

| | | |
|---|---|---|
| CN | 1551926 A | 12/2004 |
| CN | 101680076 A | 3/2010 |
| WO | 0245907 A2 | 6/2002 |
| WO | 2006129155 A1 | 12/2006 |
| WO | 2012145400 A2 | 10/2012 |

OTHER PUBLICATIONS

International Written Opinion for International Application No. PCT/US2012/034081 dated Nov. 9, 2012, 4 pages.
International Preliminary Report on Patentability for International Application No. PCT/US2012/034081 dated Oct. 22, 2013, 5 pages.
Chinese Office Action and Search Report for Chinese Application No. 201280019354.X dated Feb. 2, 2015, 17 pages with translation.
Canadian Office Action and Search Report for Canadian Application No. 2,833,386 dated Dec. 4, 2014, 4 pages.
European Search Report for European Application No. 12773536.3 dated Nov. 18, 2014, 5 pages.
Canadian Office Action for Canadian Application No. 2,833,386 dated Oct. 20, 2015, 4 pages.
Chinese Second Office Action for Chinese Application No. 201280019354.X dated Sep. 25, 2015, 7 pages.
Chinese Third Office Action for Chinese Application No. 201280019354.X dated Apr. 5, 2016, 8 pages.
Canadian Office Action for Canadian Application No. 2,833,386 dated Sep. 21, 2016, 4 pages.

* cited by examiner

METHODS FOR FORMING POLYCRYSTALLINE MATERIALS INCLUDING PROVIDING MATERIAL WITH SUPERABRASIVE GRAINS PRIOR TO HPHT PROCESSING

FIELD

The present disclosure relates generally to polycrystalline compacts, which may be used, for example, as cutting elements for earth-boring tools, and to methods of forming such polycrystalline compacts and cutting elements.

BACKGROUND

Earth-boring tools for forming wellbores in subterranean earth formations generally include a plurality of cutting elements secured to a tool body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit. In other words, earth-boring tools often include a body (e.g., a bit body or a cone) to which cutting elements are attached.

The cutting elements used in such earth-boring tools often include polycrystalline diamond compacts (often referred to as "PDCs"), one or more surfaces of which may act as cutting faces of the cutting elements. Polycrystalline diamond material is material that includes interbonded grains or crystals of diamond material. In other words, polycrystalline diamond material includes direct, inter-granular bonds between the grains or crystals of diamond material. The terms "grain" and "crystal" are used synonymously and interchangeably herein.

Polycrystalline diamond compact cutting elements are typically formed by sintering and bonding together relatively small diamond grains under conditions of high pressure and high temperature in the presence of a catalyst (e.g., cobalt, iron, nickel, or alloys and mixtures thereof) to form a layer (e.g., a compact or "table") of polycrystalline diamond material on a cutting element substrate. These processes are often referred to as high pressure and high temperature (HPHT) processes. The cutting element substrate may comprise a cermet material (i.e., a ceramic-metal composite material) such as, for example, cobalt-cemented tungsten carbide. In such instances, the cobalt (or other catalyst material) in the cutting element substrate may be swept into the diamond grains during sintering and serve as the catalyst material for forming the inter-granular diamond-to-diamond bonds, and the resulting diamond table, from the diamond grains. In other methods, powdered catalyst material may be mixed with the diamond grains prior to sintering the grains together in a HPHT process.

Upon formation of a diamond table using a HPHT process, catalyst material may remain in interstitial spaces between the grains of diamond in the resulting polycrystalline diamond compact. The presence of the catalyst material in the diamond table may contribute to thermal damage in the diamond table when the cutting element is heated during use, due to friction at the contact point between the cutting element and the formation.

Polycrystalline diamond compact cutting elements in which the catalyst material remains in the polycrystalline diamond compact are generally thermally stable up to a temperature of about seven hundred and fifty degrees Celsius (750° C.), although internal stress within the cutting element may begin to develop at temperatures exceeding about three hundred and fifty degrees Celsius (350° C.). This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about seven hundred and fifty degrees Celsius (750° C.) and above, stresses within the diamond table itself may increase significantly due to differences in the coefficients of thermal expansion of the diamond material and the catalyst material within the diamond table. For example, cobalt thermally expands significantly faster than diamond, which may cause cracks to form and propagate within the diamond table, eventually leading to deterioration of the diamond table and ineffectiveness of the cutting element.

Furthermore, at temperatures at or above about seven hundred and fifty degrees Celsius (750° C.), some of the diamond crystals within the polycrystalline diamond compact may react with the catalyst material causing the diamond crystals to undergo a chemical breakdown or back-conversion to another allotrope of carbon or another carbon-based material. For example, the diamond crystals may graphitize at the diamond crystal boundaries, which may substantially weaken the diamond table. In addition, at extremely high temperatures, in addition to graphite, some of the diamond crystals may be converted to carbon monoxide and carbon dioxide.

In order to reduce the problems associated with differential rates of thermal expansion and chemical breakdown of the diamond crystals in polycrystalline diamond compact cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the interbonded diamond crystals in the diamond table using, for example, an acid or combination of acids (e.g., aqua regia). All of the catalyst material may be removed from the diamond table, or catalyst material may be removed from only a portion thereof. Thermally stable polycrystalline diamond compacts in which substantially all catalyst material has been leached out from the diamond table have been reported to be thermally stable up to temperatures of about twelve hundred degrees Celsius (1,200° C.). It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having polycrystalline diamond compacts that are more thermally stable relative to non-leached polycrystalline diamond compacts, but that are also relatively less brittle and vulnerable to shear, compressive, and tensile stresses relative to fully leached diamond tables, cutting elements have been provided that include a diamond table in which the catalyst material has been leached from a portion or portions of the diamond table. For example, it is known to leach catalyst material from the cutting face, from the side of the diamond table, or both, to a desired depth within the diamond table, but without leaching all of the catalyst material out from the diamond table.

BRIEF SUMMARY

In some embodiments, the present disclosure includes methods of forming polycrystalline compacts. Grains of superabrasive material may be infiltrated with a molten metal alloy at a relatively low temperature (e.g., about 1200° C. or less), and the molten metal alloy may be solidified within interstitial spaces between the grains of superabrasive material to form a solid metal alloy having the grains of superabrasive material embedded therein. The solid metal alloy with the grains of superabrasive material embedded therein may be subjected to a high pressure and high temperature process to form inter-granular bonds between the grains of superabrasive material.

In additional embodiments of methods of forming polycrystalline compacts, material may be deposited on surfaces of grains of superabrasive material in a chemical vapor infiltration process to form a three-dimensional solid porous body comprising the grains of superabrasive material and the material on the surfaces of the grains of superabrasive material. The three-dimensional solid porous body then may be subjected to a high pressure and high temperature process to form inter-granular bonds between the grains of superabrasive material.

Further embodiments of the disclosure include methods of forming a cutting element comprising a polycrystalline compact for an earth-boring tool. Material may be deposited on surfaces of grains of superabrasive material in a chemical vapor infiltration process to form a three-dimensional solid porous body comprising the grains of superabrasive material and the material on the surfaces of the grains of superabrasive material. The three-dimensional solid porous body may be infiltrated with a molten metal alloy at a relatively low temperature (e.g., about 1200° C. or less), and the molten metal alloy may be solidified to provide a first metal alloy within pores of the three-dimensional solid porous body. At least a portion of the first metal alloy may be removed from the pores of the three-dimensional solid porous body. The three-dimensional solid porous body may be subjected to a high pressure and high temperature process to form intergranular bonds between the grains of superabrasive material after removing at least a portion of the first metal alloy from the pores of the three-dimensional solid porous body. The high pressure and high temperature process may result in a second metal alloy being provided within interstitial spaces between the inter-bonded grains of superabrasive material.

Additional embodiments of the disclosure include at least partially formed polycrystalline compacts and cutting elements that are formed using embodiments of methods of the disclosure. For example, in some embodiments, the present disclosure includes at least partially formed cutting elements for earth-boring tools that include a three-dimensional solid body having a porous structure. The three-dimensional solid body includes grains of superabrasive material, and material deposited on surfaces of the grains of superabrasive material. Additionally, an alloy having a melting point of about 1200° C. or less is disposed within at least some pores of the three-dimensional porous body.

BRIEF DESCRIPTION OF THE DRAWINGS

While the specification concludes with claims particularly pointing out and distinctly claiming what are regarded as embodiments of the present invention, various features and advantages of embodiments of the disclosure may be more readily ascertained from the following description of some embodiments of the disclosure when read in conjunction with the accompanying drawings, in which:

DETAILED DESCRIPTION

The illustrations presented herein are not actual views of any particular polycrystalline compact, microstructure of polycrystalline material, or earth-boring tool, and are not drawn to scale, but are merely idealized representations which are employed to describe embodiments of the disclosure. Additionally, elements common between figures may retain the same numerical designation.

As used herein, the term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "polycrystalline compact" means and includes any polycrystalline material formed by a process that involves heating and compacting a plurality of grains of material to form inter-granular bonds between the grains of material, resulting in the formation of the polycrystalline material.

As used herein, the term "superabrasive material" means diamond and/or cubic boron nitride.

Figure 1:
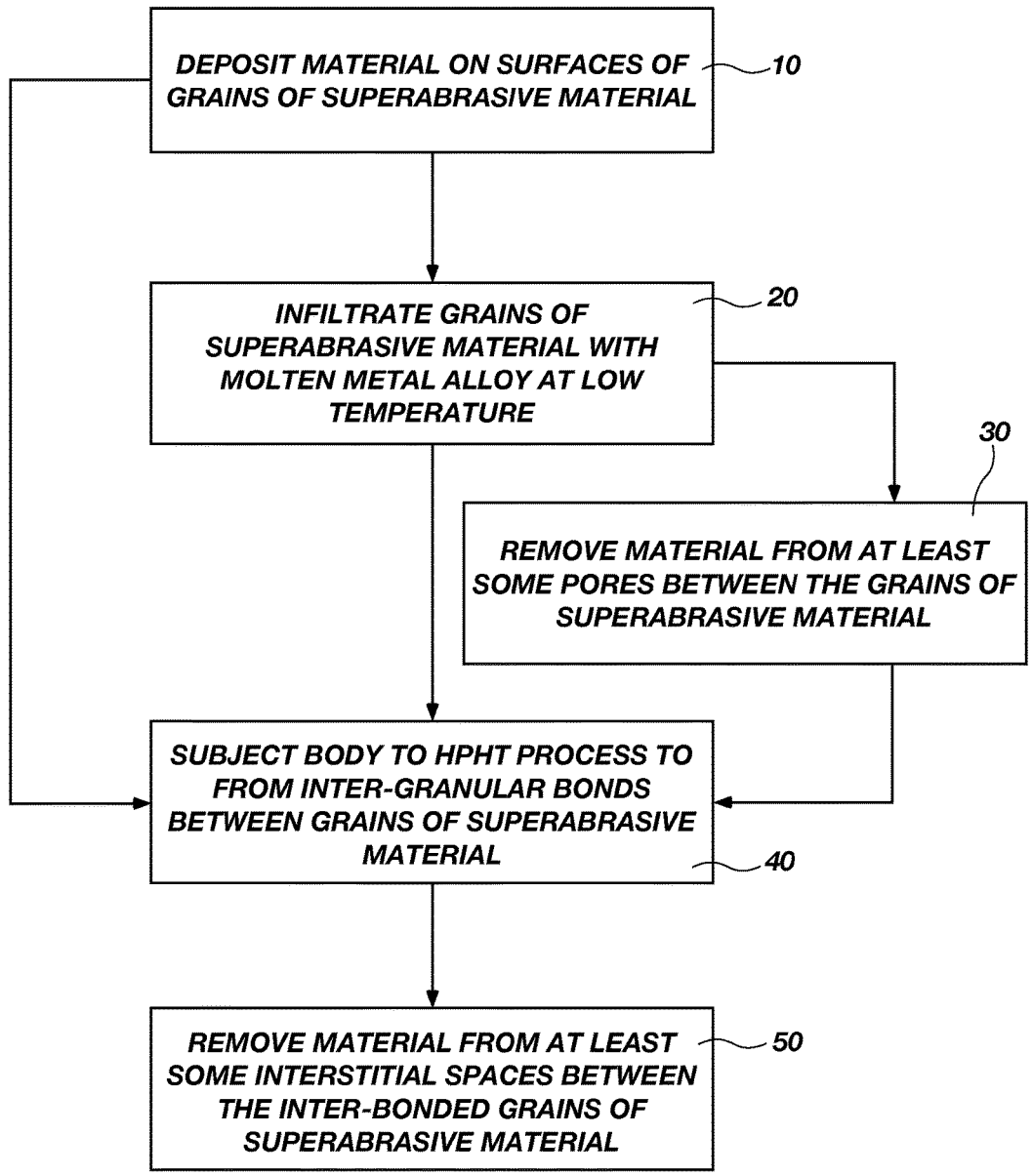
FIG. 1 is a diagram illustrating process flow of various embodiments of methods that may be used to fabricate polycrystalline compacts in accordance with embodiments of the disclosure.

Embodiments of the disclosure include methods of forming polycrystalline compacts. FIG. 1 is a flow chart used to illustrate various embodiments of methods of the disclosure, and FIGS. 2 through 12 schematically illustrate the formation of a polycrystalline compact in accordance with the process flow of FIG. 1.

Referring to FIG. 1, in action 10, material may be deposited on surfaces of grains of superabrasive material. The material may be deposited on the grains using, for example, a chemical vapor infiltration and deposition process.

Figure 2:
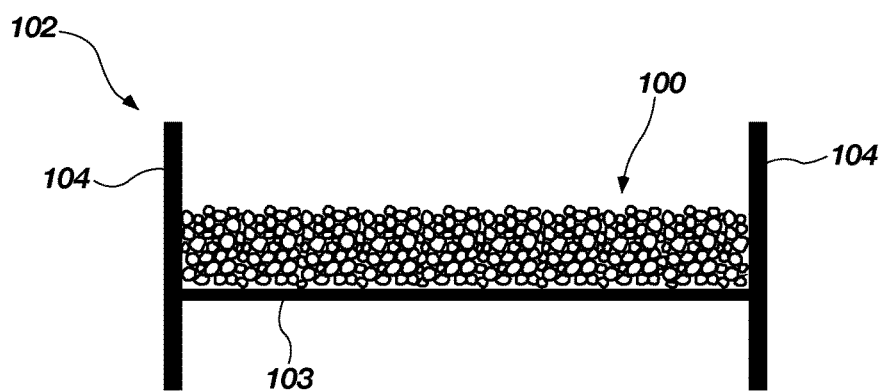
FIG. 2 is a simplified cross-sectional side view illustrating a plurality of grains of superabrasive material disposed within a container.
Figure 3:
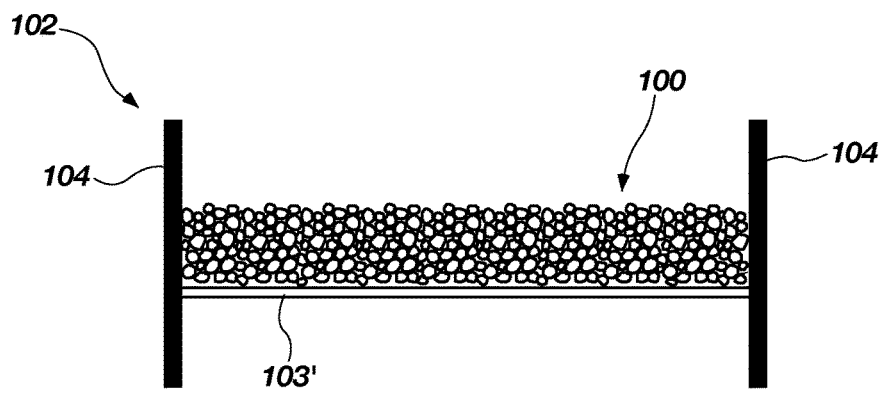
FIG. 3 is a simplified cross-sectional side view like that of FIG. 2 illustrating a plurality of grains of superabrasive material disposed within a container having a porous support layer.

As shown in FIG. 2, grains 100 of superabrasive material may be provided. The grains 100 of superabrasive material may comprise diamond grains or cubic boron nitride grains, for example. The grains 100 of superabrasive material may have an average particle size of, for example, between about one hundred nanometers (100 nm) and about fifty microns (500 μm), or even between about one micron (1 μm) and about ten microns (10 μm) in some embodiments. The grains 100 of superabrasive material may have a mono-modal grain size distribution, or a multi-modal (e.g., bi-modal, tri-modal, etc.) grain size distribution.

Optionally, in some embodiments, additional particles may be included in (e.g., mixed with) the grains 100 of superabrasive material. By way of example and not limitation, additional particles that exhibit a negative thermal expansion coefficient over at least a range of temperatures between room temperature and about 1,000° C. may be selected for inclusion with the grains 100 of superabrasive material. For example, it is known that cubic zirconium tungstate ($ZrW_2O_8$) exhibits a negative coefficient of thermal expansion over a temperature range extending from room temperature to about 775° C., and particles of zirconium tungstate may be included with the grains 100 of superabrasive material in some embodiments of the disclosure. Such particles may have an average particle size and particle size distribution as described herein in relation to the grains 100 of superabrasive material. As one non-limiting example, the grains 100 of superabrasive material may comprise a plurality of diamond grains having a bi-modal grain size distribution and an average grain size of about five microns (5 μm). About five percent by weight (5 wt %) zirconium tungstate particles having an average grain size of about one micron (1 μm) may be combined with the diamond grains and subjected to further processing as described below.

Other types of additional particles that may be included with the grains 100 of superabrasive material include, for example, ceramic particles (e.g., carbides, borides, nitrides, etc.), metallic particles (e.g., particles of iron, cobalt, nickel, their alloys, etc.), non-diamond carbon-based particles (amorphous carbon, graphite, etc.), previously sintered polycrystalline diamond particles, etc.

The grains 100 of superabrasive material (and any additional particles included therewith) may be provided in a container 102 having a shape corresponding generally to a shape of a polycrystalline compact to be formed, as shown in FIG. 2. For example, if the polycrystalline compact is to have a cylindrical disc shape, the inner surfaces of the container 102 may define a generally cylindrical receptacle for receiving the grains 100 of superabrasive material therein. For example, the container 102 may comprise a support layer 103 on which the grains 100 of superabrasive material may be supported within the container 102, and one or more lateral sidewalls 104 extending vertically along a periphery of the support layer 103 for lateral confinement of the grains 100 of superabrasive material. The support layer 103 and the one or more lateral sidewalls 104 of the container 102 may comprise, for example, a ceramic or a metal material that is stable and inert in the environmental conditions to be encountered during the deposition process.

Optionally, in embodiments in which the grains 100 of superabrasive material comprise diamond, the grains 100 of superabrasive material may be heated to a temperature of about 1,000° C. for about five minutes (5 min.) to slightly graphitize surfaces of the grains 100.

The container 102 with the grains 100 of superabrasive material therein then may be provided within a chemical vapor deposition chamber, and chemical vapors may be allowed or caused to infiltrate the spaces between the grains 100 of superabrasive material, and to deposit material onto the surfaces of the grains 100 of superabrasive material.

Figure 5:
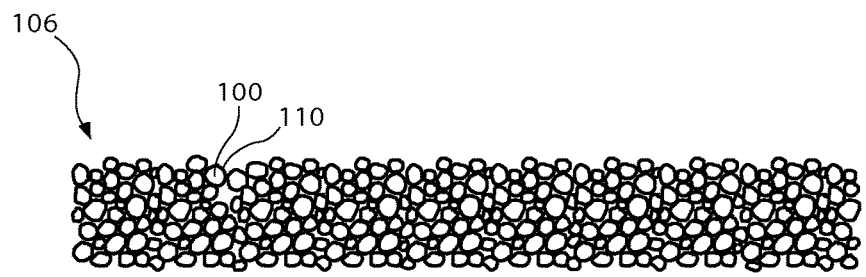
FIG. 5 is a simplified cross-sectional side view of a three-dimensional solid porous body that includes the grains of superabrasive material of FIG. 2 with material deposited on surfaces of the grains of superabrasive material.

The deposition of the material onto the grains 100 of superabrasive material may result in the formation of a three-dimensional solid porous body 106, shown in FIG. 5, comprising the grains 100 of superabrasive material and a material 110 deposited on the surfaces of the grains 100 of superabrasive material. The material 110 deposited on the grains 100 may service to bond the adjacent grains 100 of superabrasive material to one another, thereby transforming the volume of loose grains 100 into the three-dimensional solid porous body 106.

The material 110 deposited on the surfaces of the grains 100 of superabrasive material may comprise, for example, one or more of a carbon-based material (e.g., diamond or a diamond-like material), a carbide (e.g., silicon carbide, tungsten carbide, etc.) a nitride (e.g., silicon nitride), a metal (e.g., cobalt, iron, nickel, etc.).

By way of non-limiting example, the material 110 may be deposited on the grains 100 of superabrasive material using a chemical vapor infiltration and deposition process as described in U.S. Pat. No. 5,527,747, issued Jun. 18, 1996, to Lackey, Jr. et al., the disclosure of which is incorporated herein in its entirety by this reference. As disclosed therein, reagent gases may be caused to flow through the volume of the grains 100 of superabrasive material, and energy may be applied to the reagent gases to generate a plasma, from which a material, such as diamond or a diamond-like material, may be deposited on the grains 100 of superabrasive material.

Figure 4:
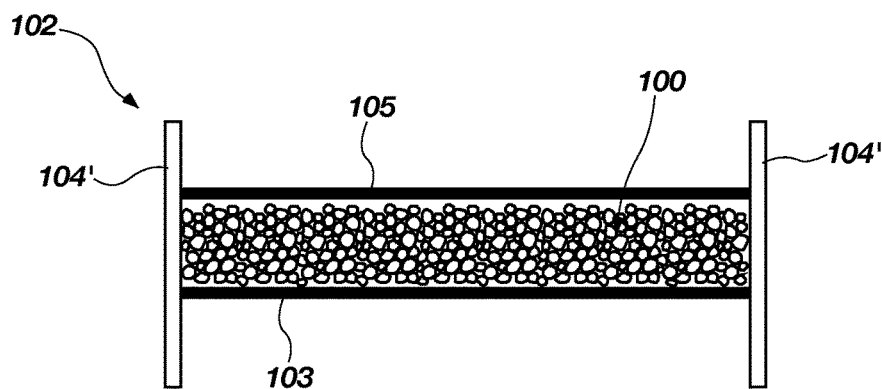
FIG. 4 is a simplified cross-sectional side view like those of FIGS. 2 and 3 illustrating a plurality of grains of superabrasive material disposed within a container having a porous lateral sidewall.

In some embodiments, the reagent gases may be forced to flow through the grains 100 of superabrasive material within the deposition chamber. For example, referring to FIG. 3, support layer 103 of the container 102 may comprise a porous support layer 103' on which the grains 100 of superabrasive material are supported within the container 102. The reagent gases then may be forced to flow vertically through the grains 100 of superabrasive material and the porous support layer 103' (in either the upward or downward directions from the perspective of FIG. 3) within the deposition chamber during the deposition process. The porous support layer 103' may comprise, for example, a porous ceramic material (e.g., alumina, zirconia, silicon carbide, etc.), or a porous layer of graphite (e.g., a graphite fiber mat or fabric). In additional embodiments, the one or more lateral sidewalls 104 of the container 102 may comprise a porous sidewall 104', and the reagent gases may be forced to flow horizontally through the porous sidewall 104' and the grains 100 of superabrasive material, as shown in FIG. 4. In such embodiments, the support layer 103 may be at least substantially impermeable to the reagent gases, and a cover 105 that is also at least substantially impermeable to the reagent gases may be provided over the grains 100 of superabrasive material, such that the reagent gases are vertically confined within the container 102 and forced to flow horizontally through the grains 100 of superabrasive material.

In the methods of U.S. Pat. No. 5,527,747, diamond is deposited on diamond grains until the volume of diamond grains becomes impermeable. In embodiments of the present disclosure, however, the material 110 may be deposited on the grains 100 of superabrasive material to a thickness sufficient to result in the formation of the three-dimensional solid porous body 106, but without causing the three-dimensional solid porous body 106 to become impermeable, and so as to leave a network of pores within the three-dimensional solid porous body 106. In some embodiments, the three-dimensional solid porous body 106 may comprise a substantially continuous open pore network to allow a molten metal to infiltrate into the pores within the three-dimensional solid porous body 106 as described in further detail below.

In some embodiments, the material 110 deposited on the grains 100 of superabrasive material may comprise two or more layers having differing compositions, each of which may be individually selected from a carbon based material (e.g., diamond or a diamond-like material), a carbide (e.g., silicon carbide, tungsten carbide, etc.) a nitride (e.g., silicon nitride), and a metal (e.g., cobalt, iron, nickel, etc.). For example, in some embodiments, the material 110 may comprise a first layer including diamond or a diamond-like material, and a second layer including one or more of cobalt, iron, and nickel.

As one particular non-limiting example, the grains 100 of superabrasive material may comprise a plurality of diamond grains having a bi-modal particle size distribution and an average particle size of about five microns (5 μm). About five weight percent (5 wt %) zirconium tungstate particles may be combined with the diamond grains, as described above. The particle mixture may be disposed in a container 102, which may comprise a porous graphite material. The container 102 with the particulate mixture therein may be placed in a column purged by an inert gas (e.g., argon), after which the column may be heated to about 1,200° C. and a silicon carbide organometallic precursor gas, such as methyltrichlorosilane, dimethyldichlorosilane, or triethylsilane, may be caused to pass through the particulate mixture such that a relatively thin coating of silicon carbide (SiC) is deposited onto the surfaces of the diamond grains and the surfaces of the zirconium tungstate particles to form a three-dimensional solid porous body 106, which may be subjected to further processing as described herein.

Referring again to FIG. 1, in action 20, the grains 100 of superabrasive material (and any material 110 disposed on surfaces thereof) may be infiltrated with a molten metal alloy at a relatively low temperature, such as about 1200° C. or less, or even about 750° C. or less in some embodiments.

In some embodiments, the infiltration process of action 20 may comprise an infiltration process as described in U.S. Pat. No. 7,879,129, issued Feb. 1, 2011, the disclosure of which is incorporated herein in its entirety by this reference.

Figure 6:
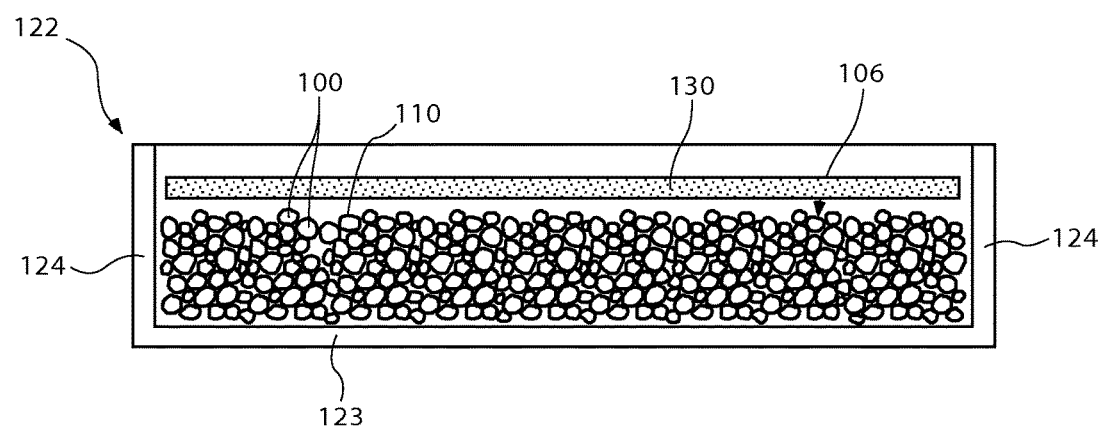
FIG. 6 is a cross-sectional side view illustrating the three-dimensional solid porous body disposed within another container with a volume of solid metal alloy disposed over the solid porous body within the container.

Referring to FIG. 6, the three-dimensional solid porous body 106 of FIG. 5 may be positioned within a container 122. The container 122 may have a shape corresponding generally to a shape of a polycrystalline compact to be formed. For example, if the polycrystalline compact is to have a cylindrical disc shape, the inner surfaces of the container 122 may define a generally cylindrical receptacle for receiving the three-dimensional solid porous body 106 (which includes the grains 100 of superabrasive material) therein. For example, the container 122 may comprise a support layer 123 on which the three-dimensional solid porous body 106 may be supported within the container 122, and one or more lateral sidewalls 124 extending vertically along a periphery of the support layer 123. The support layer 123 and the one or more lateral sidewalls 124 of the container 122 may comprise, for example, a ceramic or a metal material that is stable and inert in the environmental conditions to be encountered during the infiltration process. The container 122 may serve as a mold during the infiltration process.

A volume of a solid metal alloy 130 may be provided over the three-dimensional solid porous body 106 within the container 122 as shown in FIG. 6. The metal alloy 130 may comprise, for example, a nickel alloy having a melting temperature below a temperature at which degradation of the grains 100 of superabrasive material might occur. For example, it is known that diamond grains may begin to decompose at temperatures greater than about 750° C. (in the absence of sufficient applied pressure). Thus, in some embodiments, the metal alloy 130 may have a melting point of about 1200° C. or less, or even about 750° C. or less in some embodiments. In some embodiments, the metal alloy 130 may comprise one or more of a cobalt alloy having a melting temperature of about 1200° C. or less (or even below about 750° C.), an iron alloy having a melting temperature of about 1200° C. or less (or even below about 750° C.), and a nickel alloy having a melting temperature of about 1200° C. or less (or even below about 750° C.). Additionally, in some embodiments, the metal alloy 130 may comprise one or more elements that serve as a catalyst for catalyzing the formation of inter-granular bonds between the grains 100 of superabrasive material in a subsequent high temperature and high temperature process. For example, it is known that the iron group elements of iron, cobalt, and nickel may serve as catalysts for the formation of inter-granular bonds between diamond grains. As one non-limiting example, the metal alloy 130 may comprise about fifty-five and one-half percent (by weight) (55.5 wt %) nickel, about fifteen percent (15.0 wt %) chromium, about seven percent (7.0 wt %) iron, about two and one-half percent (2.5 wt %) titanium, and about twenty percent (20.0 wt %) silicon.

The container 122 with the three-dimensional solid porous body 106 and the volume of solid metal alloy 130 therein may be heated in an inert atmosphere to a temperature of about 1200° C. or less, or even below about 750° C. or less in some embodiments, to melt the volume of solid metal alloy 130. The molten volume of solid metal alloy 130 then may be allowed or caused to infiltrate into the pores within the three-dimensional solid porous body 106 in the spaces between the grains 100 of superabrasive material. In some embodiments, the container 122 with the three-dimensional solid porous body 106 and the volume of solid metal alloy 130 therein may be heated in an enclosed chamber, which may be pressurized with an inert gas to assist the infiltration of the molten metal alloy 130 into the pores of the three-dimensional solid porous body 106. By way of example and not limitation, an isostatic or axial (e.g., uniaxial or biaxial) pressure of about 500 MPa or less (e.g., about 200 MPa) may be applied within such an enclosed chamber to assist the infiltration of the molten metal alloy 130 into the pores of the three-dimensional solid porous body 106. In additional embodiments, however, the molten metal alloy 130 may be infiltrated into the pores of the three-dimensional solid porous body 106 at about atmospheric pressure (without any additional applied pressure).

The molten metal alloy 130 may be allowed to cool within the pores of the three-dimensional solid porous body 106 resulting in the formation of an at least substantially fully dense body comprising the three-dimensional solid porous body 106 of FIG. 6 with the solidified metal alloy 130 disposed in the pores of the three-dimensional solid porous body 106 within the spaces between the grains 100 of superabrasive material. It is noted that the resulting article may comprise a useful abrasive article that may be employed as such without further processing. In other embodiments, the resulting article may be further processed as described below.

Figure 7:
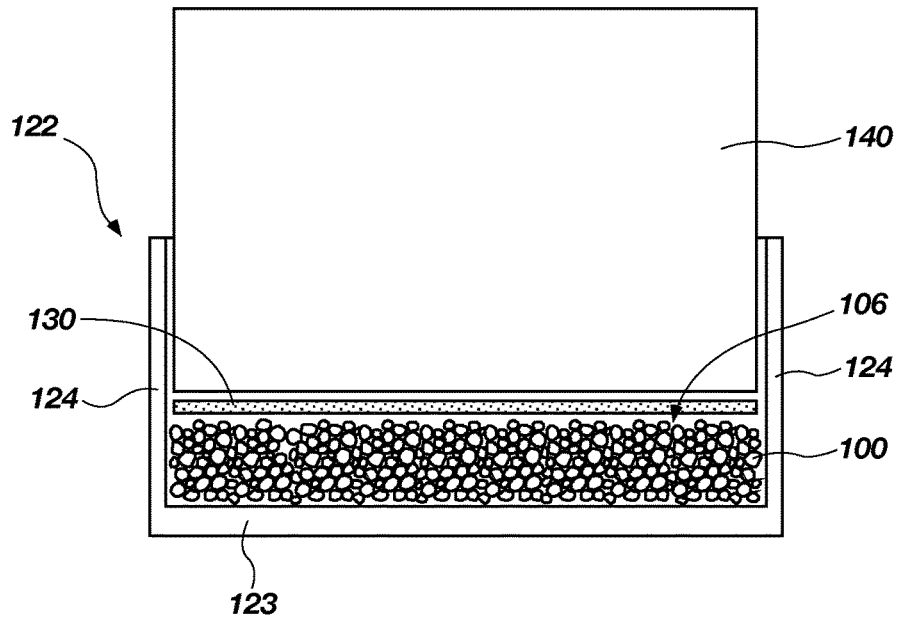
FIG. 7 is a cross-sectional side view like that of FIG. 6 and illustrates a substrate disposed over the three-dimensional solid porous body within a container with a volume of solid metal alloy disposed between the substrate and the three-dimensional solid porous body.

In some embodiments, a substrate may be attached to the three-dimensional solid porous body 106 during the infiltration process of action 20 (FIG. 1). For example, as shown in FIG. 7, a substrate 140 may be positioned over the solid metal alloy 130 and the three-dimensional solid porous body 106 within the container 122 to form an assembly, which then may be heated to melt the metal alloy 130. The molten metal alloy 130 may then be caused to infiltrate into the three-dimensional solid porous body 106. The molten metal alloy 130 may also wet the surfaces of the substrate 140 such that, when the molten metal alloy 130 is cooled and solidified, the substrate 140 is bonded to the solid metal alloy 130, which will have the three-dimensional solid porous body 106 and the grains 100 of superabrasive material embedded therein.

The substrate 140 may comprise a wear-resistant material, such as cemented tungsten carbide. Cemented tungsten carbide includes grains of tungsten carbide that are cemented within a metal alloy, which is often an alloy of one or more of cobalt, iron, and nickel. The metal alloy is often referred to as the "binder" or "matrix" metal. The grains of tungsten carbide may have an average grain size of between about one hundred nanometers (100 nm) to about fifteen microns (15 µm) or more. More particularly, the grains of tungsten carbide may have an average grain size of between about five hundred nanometers (500 nm) and about ten microns (10 µm). Further, the binder metal may comprise between about four percent by weight (4 wt %) and about twenty percent by weight (20 wt %) of the cemented tungsten carbide material. More particularly, the binder metal may comprise between about six percent by weight (6 wt %) and about fifteen percent by weight (15 wt %) of the cemented tungsten carbide material. Further, carbides, nitrides, borides and other hard materials other than tungsten carbide may be used to form the wear-resistant material of the substrate 140 in additional embodiments.

Figure 8:
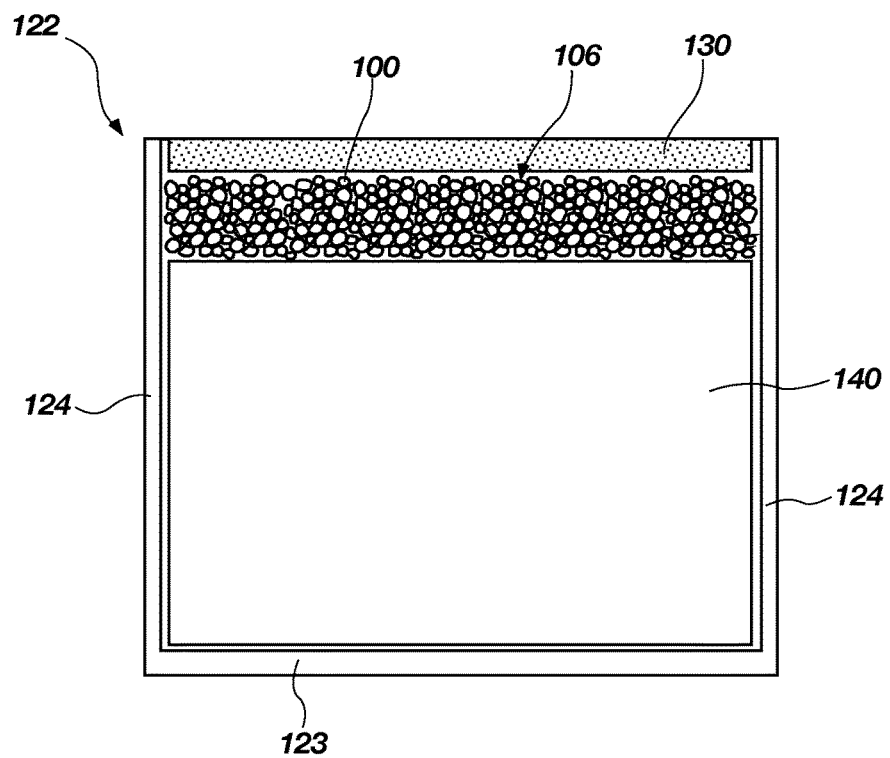
FIG. 8 is a cross-sectional side view like that of FIG. 7, but illustrates the three-dimensional solid porous body between the substrate and the volume of solid metal alloy within a container.

In the embodiment of FIG. 7, the solid metal alloy 130 is disposed between the substrate 140 and the three-dimensional solid porous body 106 prior to heating and melting the three-dimensional solid porous body 106. In additional embodiments, as shown in FIG. 8, the three-dimensional solid porous body 106 may be disposed between the substrate 140 and the solid metal alloy 130 prior to heating prior to heating and melting the three-dimensional solid porous body 106. In such embodiments, once melted, the molten metal alloy 130 may infiltrate through the pores within the three-dimensional solid porous body 106 to the substrate 140. The molten metal alloy 130 then may wet the surfaces of the substrate 140 such that, when the molten metal alloy 130 is cooled and solidified, the substrate 140 is bonded to the solid metal alloy 130, which will have the three-dimensional solid porous body 106 and the grains 100 of superabrasive material embedded therein.

In some embodiments, it may be desirable to treat a surface of the substrate 140 to improve the strength of the bond between the surface of the substrate 140 and the solid metal alloy 130 having the three-dimensional solid porous body 106 and the grains 100 of superabrasive material embedded therein. For example, in embodiments in which the substrate 140 comprises a cemented tungsten carbide material, it may be desirable to remove at least a portion of the binder metal from between the tungsten carbide grains in a region of the substrate 140 adjacent a surface of the substrate 140 to be bonded to the solid metal alloy 130. For example, referring to FIG. 9, a bonding surface 142 of the substrate 140 may be treated with an acid to remove at least a portion of the binder metal from between the tungsten carbide grains in a region 144 of the substrate 140 (i.e., the region between the dashed lines) adjacent the bonding surface 142 of the substrate 140. By removing at least a portion of the binder metal from between the tungsten carbide grains in a region 144, the molten metal alloy 130 may be able to infiltrate into and wet the grains of tungsten carbide in the region 144, which may improve the strength of the bond to the substrate 140.

Figure 9:
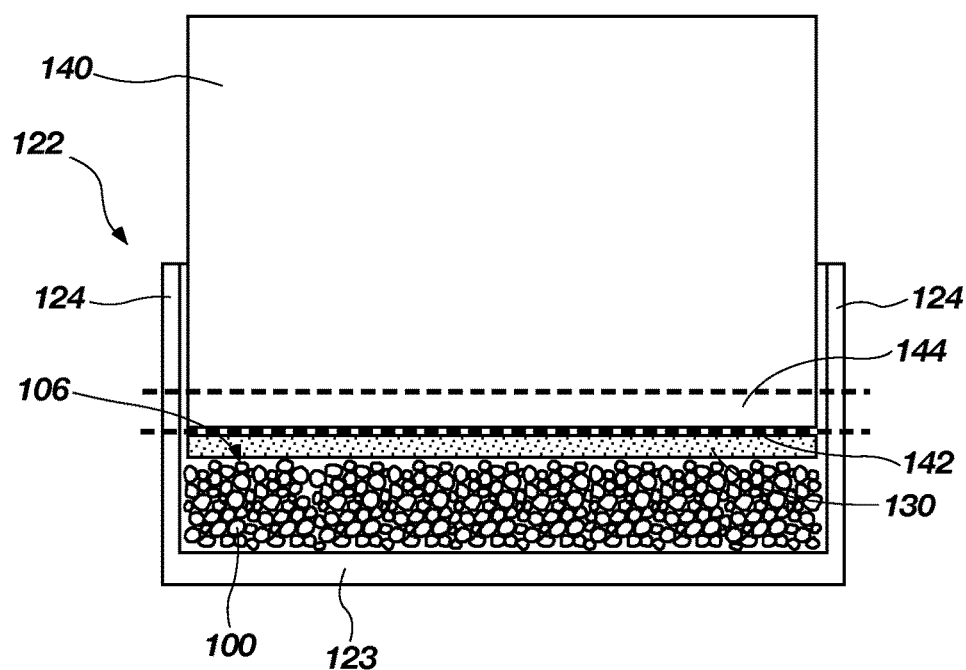
FIG. 9 is a cross-sectional side view like that of FIG. 7 but further illustrating a treated section of the substrate adjacent the volume of solid metal alloy, which may improve a bond between the substrate and the three-dimensional solid porous body.
Figure 10:
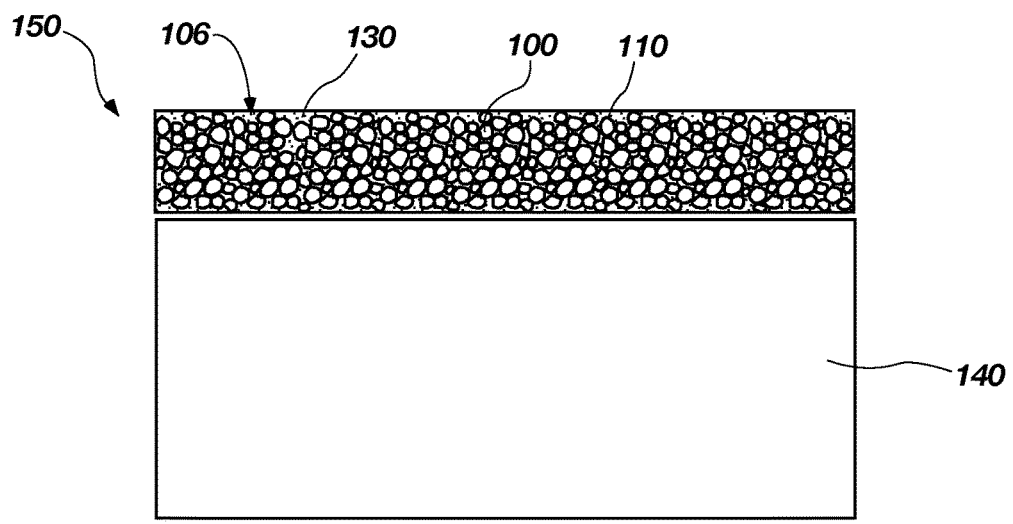
FIG. 10 illustrates a partially formed cutting element that may be formed from any of the assemblies shown in FIGS. 7 through 9 by infiltrating the metal alloy into the three-dimensional solid porous body adjacent the substrate.

FIG. 10 illustrates a structure 150 that may be formed from the assemblies of FIGS. 7 through 9 by infiltrating the metal alloy 130 into the pores in the three-dimensional solid porous body 106 and in the spaces between the grains 100 of superabrasive material. The structure 150 includes the substrate 140, the three-dimensional solid porous body 106 (which includes the grains 100 of superabrasive material with the additional material 110 deposited on surfaces thereof), and the metal alloy 130, which is disposed in the pores of the three-dimensional solid porous body 106 and bonds the three-dimensional solid porous body 106 to the substrate 140.

Referring again to FIG. 1, after infiltrating the grains 100 of superabrasive material with the molten metal alloy 130 in accordance with action 20, at least some of the metal alloy 130 optionally may be removed from at least some of the pores between the grains 100 of superabrasive material. For example, in some embodiments, some or all of the metal alloy 130 may be leached out from the pores of the three-dimensional solid porous body 106. By way of example and not limitation, a liquid acid may be used to etch away or otherwise leach some or all of the metal alloy 130 from the pores of the three-dimensional solid porous body 106 between the grains 100 of superabrasive material. In some embodiments, the substrate 140 also may be separated from the three-dimensional solid porous body 106, which includes the grains 100 of superabrasive material, the material 110 deposited on surfaces of the grains 100, and, in some cases, any metal alloy 130 remaining in the pores of the three-dimensional solid porous body 106. In other embodiments, however, the substrate 140 may not be removed, and may included in and subjected to a high pressure and high temperature process, as described below.

Referring to FIG. 1, in action 40, a body including the grains 100 of superabrasive material, such as the structure 150 of FIG. 10, may be subjected to a high pressure and high temperature (HPHT) process to form inter-granular bonds directly between the grains 100 of superabrasive material, resulting in the formation of a polycrystalline compact including the polycrystalline material formed from the inter-bonded grains 100 of superabrasive material. Such HPHT processes are known in the art. Although the exact operating parameters of HPHT processes will vary depending on the particular compositions and quantities of the various materials being sintered, the pressures in the heated press may be greater than about five gigapascals (5.0 GPa) and the temperatures may be greater than about thirteen hundred and fifty degrees Celsius (1,350° C.). In some embodiments, the temperatures in the heated press may be greater than about fifteen hundred and fifty degrees Celsius (1,550° C.). Additionally, the pressures in the heated press may be greater than about 6.5 GPa (e.g., about 6.6 GPa) in some embodiments. Furthermore, the materials being sintered may be held at such temperatures and pressures for a time period of about twenty minutes (30 min.) or less in some embodiments (e.g., between about thirty seconds (30 sec.) and about twenty minutes (20 min.)).

In embodiments in which the grains 100 of superabrasive material have been infiltrated with molten metal alloy 130 in accordance with action 20 of FIG. 1, the process of action 40 may comprise subjecting the solid metal alloy 130 having the grains 100 of superabrasive material embedded therein to the HPHT process to form the inter-granular bonds between the grains 100 of superabrasive material.

Optionally, the methods disclosed in U.S. Patent Application Publication No. 20110073380, published Mar. 31, 2011 and entitled "Production of reduced Catalyst PDC Via Gradient Driven Reactivity," which is incorporated herein in its entirety by this reference, may be employed in the HPHT process in order to facilitate mass transport during the sintering process, to enhance the compaction of the particles in the HPHT process, and to enhance the formation of inter-granular bonds between the grains 100 of superabrasive material.

In embodiments in which material 110 has been deposited on the surfaces of the grains 100 of superabrasive material to form a three-dimensional solid porous body 106 like that shown in FIG. 5 in accordance with action 10 of FIG. 1, the process of action 40 may comprise subjecting the three-dimensional solid porous body 106 to the HPHT process to form the inter-granular bonds between the grains 100 of superabrasive material. In embodiments in which material 110 has been deposited on the surfaces of the grains 100 of superabrasive material to form a three-dimensional solid porous body 106 in accordance with action 10 of FIG. 1, and in which the grains 100 of superabrasive material have been infiltrated with molten metal alloy 130 in accordance with action 20 of FIG. 1, the process of action 40 may comprise subjecting the solid metal alloy 130 and the three-dimensional solid porous body 106, which includes the grains 100 of superabrasive material and the material 110 deposited thereon, to the HPHT process.

In some embodiments, a substrate may be included with the grains 100 of superabrasive material in the HPHT process. Such a substrate may be the substrate 140 previously described herein, or it may be another substrate, which may be at least substantially similar to the previously described substrate 140. In other embodiments, however, a substrate may not be included with the grains 100 of superabrasive material in the HPHT process.

Figure 11:
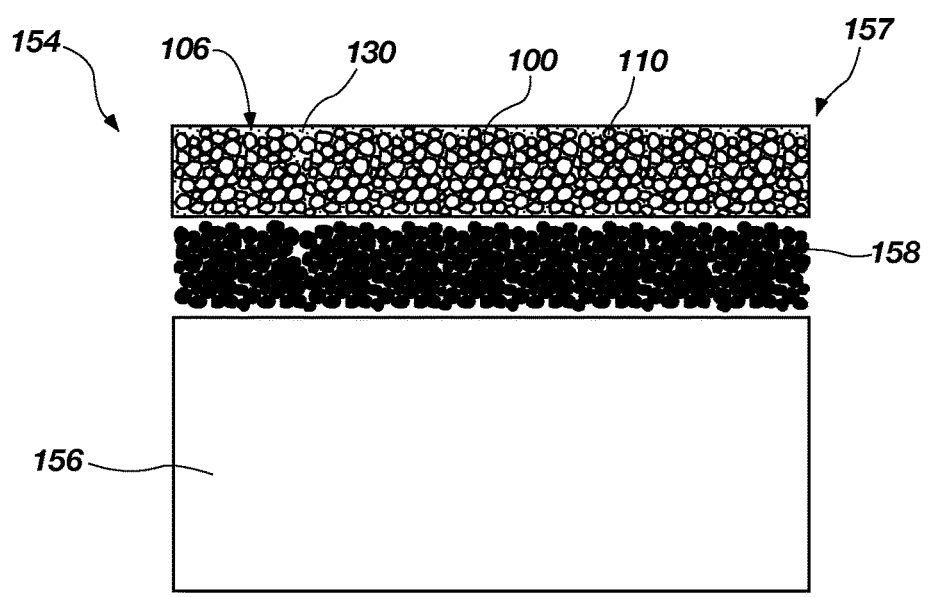
FIG. 11 illustrates additional grains of superabrasive material disposed between a body including grains of superabrasive material and a substrate in preparation for subjecting the assembly to a high pressure and high temperature process to form a cutting element including a polycrystalline compact.

If a substrate may be included with the grains 100 of superabrasive material in the HPHT process, and the grains 100 are disposed in a three-dimensional solid porous body 106, and/or have been infiltrated with a metal alloy 130, it may be desirable to include additional loose grains of superabrasive material over the bonding surface of the additional substrate in the HPHT process to improve the bonding to the additional substrate. For example, FIG. 11 illustrates an assembly 154 to be subjected to the HPHT process of action 40 of FIG. 1. The assembly 154 includes an additional substrate 156, and a body 157 that includes the three-dimensional solid porous body 106 (including the grains 100 of superabrasive material and the material 110 deposited thereon) with the metal alloy 130 infiltrated into pores of the three-dimensional solid porous body 106 between the grains 100 of superabrasive material. The assembly 154 also includes additional grains 158 of superabrasive material (e.g., diamond or cubic boron nitride) disposed between the body 157 and the additional substrate 156. During the HPHT process, molten metal may flow from one or both of the body 157 and the additional substrate 156 into the interstitial spaces between the additional grains 158 of superabrasive material, which may improve a bond strength between the body 157 and the additional substrate 156.

Figure 12:
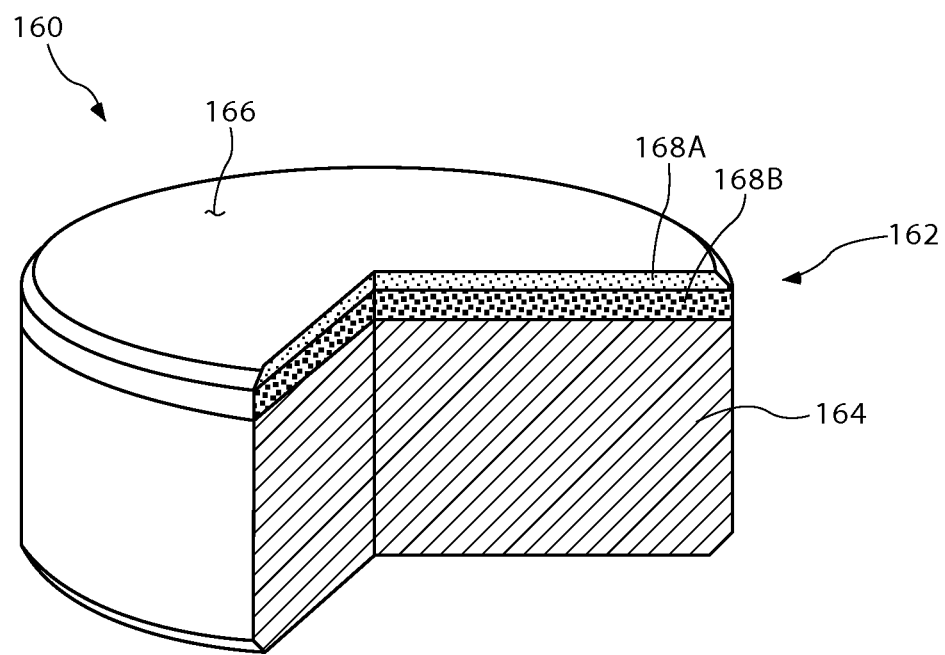
FIG. 12 is a partial cut-away perspective view illustrating a cutting element that may be formed in accordance with methods of embodiments of the disclosure.

FIG. 12 illustrates an example embodiment of a cutting element 160 that may be formed by the HPHT process of action 40 (FIG. 1). As shown in FIG. 12, the cutting element 160 includes a polycrystalline compact 162 that is bonded to a cutting element substrate 164. The polycrystalline compact 162 comprises a table or layer of superabrasive polycrystalline material 166 that has been formed on a surface of the supporting cutting element substrate 164. The cutting element substrate 164 may comprise a substrate as previously described with reference to the substrate 140.

The superabrasive polycrystalline material 166 comprises a plurality of inter-bonded grains 100 of superabrasive material, such as diamond or cubic boron nitride. In other words, the superabrasive polycrystalline material 166 may comprise polycrystalline diamond in some embodiments. In other embodiments, the superabrasive polycrystalline material 166 may comprise polycrystalline cubic boron nitride.

One or more materials may be disposed in interstitial spaces between inter-bonded grains 100 of hard material in at least a portion of the superabrasive polycrystalline material 166 of the polycrystalline compact 162. These one or more materials may be formed from and comprise one or more of the material 110 deposited on the grains 100 of superabrasive material, the metal alloy 130 infiltrated into the grains 100 of superabrasive material, and materials swept into the grains 100 of superabrasive material from the substrate 164.

Referring again to FIG. 1, after the HPHT process of action 40, in action 50, at least some material optionally may be removed from at least some interstitial spaces between the inter-bonded grains of the superabrasive polycrystalline material 166 of the polycrystalline compact 162 formed by the HPHT process. The material may be removed from at least some of the interstitial spaces using, for example, an acid leaching process. Specifically, as known in the art and described more fully in U.S. Pat. No. 5,127,923 and U.S. Pat. No. 4,224,380, which are incorporated herein in their entirety by this reference, aqua regia (a mixture of concentrated nitric acid ($HNO_3$) and concentrated hydrochloric acid (HCl)) may be used to remove material from the interstitial spaces between the inter-bonded grains of the superabrasive polycrystalline material 166 of the polycrystalline compact 162. It is also known to use boiling hydrochloric acid (HCl) and boiling hydrofluoric acid (HF).

Removing material from the interstitial spaces between the inter-bonded grains of the superabrasive polycrystalline material 166 of the polycrystalline compact 162 may render the superabrasive polycrystalline material 166 relatively more thermally stable and less susceptible to thermal shock, thermal checking, and other forms of thermal degradation.

In some embodiments, material may be removed from the interstitial spaces between the inter-bonded grains of the superabrasive polycrystalline material 166 in a first leached region 168A of the polycrystalline compact 162, and material may be left within the interstitial spaces between the inter-bonded grains of the superabrasive polycrystalline material 166 in a second un-leached region 168B of the polycrystalline compact 162, as shown in FIG. 12. The first leached region 168A may comprise a region located proximate an intended working surface of the cutting element 160, and the second un-leached region 168B may be disposed between the first leached region 168A and the substrate 164.

With continued reference to FIG. 1, in some embodiments, methods of the disclosure may include each of actions 10 through 50, as described above. In additional embodiments, however, the methods may not include one or more of actions 10, 20, 30, and 50. For example, some embodiments may not include action 10, but may include actions 20 and 40, and optionally one or both of actions 30 and 50. Additional embodiments may not include actions 20 and 30, but may include actions 10 and 40, and optionally action 50.

The various embodiments of the disclosure may provide one or more advantages over previously known methods of forming polycrystalline compacts. For example, it is known that HPHT processes (like those of action 40 in FIG. 1) often result in fracture of the grains 100 of superabrasive material and an accompanying reduction in average grain size in the polycrystalline compact. By infiltrating a metal alloy 130 into the grains 100 of superabrasive material in accordance with action 20 of FIG. 1, the metal alloy 130 may provide a cushion against such fracturing of some of the grains 100 of superabrasive material. As a result, embodiments of the disclosure may allow for unique grain size distributions in the grains 100 of superabrasive material of the resulting polycrystalline compact. When the grains 100 of superabrasive material comprise diamond, additional diamond material may be deposited on the grains 100 in action 10 of FIG. 1, which may allow for higher diamond densities in the resulting polycrystalline compact. The combination of the deposition process of action 10 and the infiltration process of action 20 may result in a stronger polycrystalline compact. Additionally, it is known that certain material compositions are not stable for extended periods of time under the high pressure and high temperature conditions encountered in standard HPHT processes. By employing the deposition process of action 10 and the infiltration process of action 20 of FIG. 1, it may be possible to shorten the cycle time of the HPHT process used to form the polycrystalline compacts, and embodiments of methods of the disclosure may allow for such unstable compositions to be incorporated into the resulting polycrystalline compact.

The foregoing description is directed to particular embodiments for the purpose of illustration and explanation. It will be apparent, however, to one skilled in the art that many modifications and changes to the embodiments set forth above are possible without departing from the scope of the embodiments disclosed herein as hereinafter claimed, including legal equivalents. It is intended that the following claims be interpreted to embrace all such modifications and changes.

What is claimed is:

1. A method of forming a polycrystalline compact, comprising:
   mixing grains of superabrasive material with particles of a material that exhibits a negative thermal expansion coefficient over at least a range of temperatures between room temperature and about 1000° C.;
   depositing at least two layers of material on the grains of superabrasive material in a chemical vapor infiltration process, the at least two layers having differing compositions, a first layer of the at least two layers of material comprising a carbon based material, a second layer of the at least two layers of material comprising at least one of cobalt, iron, and nickel;
   infiltrating the grains of superabrasive material having the at least two layers of material deposited thereon and the particles with a molten metal alloy at a temperature of about 1200° C. or less and cooling and solidifying the molten metal alloy within interstitial spaces between the grains of superabrasive material and the particles to form a solid metal alloy having the grains of superabrasive material and the particles embedded therein, wherein the grains of superabrasive material are free of inter-granular bonds directly between the grains of superabrasive material; and
   after forming the solid metal alloy, subjecting the solid metal alloy having the grains of superabrasive material and the particles embedded therein to a high pressure and high temperature process to form inter-granular bonds between the grains of superabrasive material.

2. The method of claim 1, wherein subjecting the solid metal alloy having the grains of superabrasive material and the particles embedded therein to a high pressure and high temperature process comprises subjecting the solid metal alloy having the grains of superabrasive material and the particles embedded therein to a pressure of at least about 5.0 GPa and a temperature of at least about 1350° C.

3. The method of claim 2, wherein subjecting the solid metal alloy having the grains of superabrasive material and the particles embedded therein to a pressure of at least about 5.0 GPa and a temperature of at least about 1350° C. comprises subjecting the solid metal alloy having the grains of superabrasive material and the particles embedded therein to a pressure of at least about 6.6 GPa and a temperature of at least about 1550° C. for a time of about twenty minutes or less.

4. The method of claim 1, wherein infiltrating the grains of superabrasive material and the particles with the molten metal alloy at a temperature of about 1200° C. or less comprises infiltrating the grains of superabrasive material and the particles with at least one of a nickel alloy having a melting temperature of about 1200° C. or less, a cobalt alloy having a melting temperature of about 1200° C. or less, and an iron alloy having a melting temperature of about 1200° C. or less.

5. The method of claim 1, wherein infiltrating the grains of superabrasive material and the particles with the molten metal alloy at a temperature of about 1200° C. or less further comprises infiltrating the grains of superabrasive material and the particles with the molten metal alloy at a pressure of about 500 MPa or less.

6. A method of forming a polycrystalline compact, comprising:
   mixing grains of superabrasive material with particles of a material that exhibits a negative thermal expansion coefficient over at least a range of temperatures between room temperature and about 1000° C.;
   depositing at least two layers of material on the grains of superabrasive material in a chemical vapor infiltration process, the at least two layers having differing compositions, a first layer of the at least two layers of material comprising a carbon based material, a second layer of the at least two layers of material comprising at least one of cobalt, iron, and nickel;
   infiltrating the grains of superabrasive material having the at least two layers of material deposited thereon and the particles with a molten metal alloy at a temperature of about 1200° C. or less and cooling and solidifying the molten metal alloy within interstitial spaces between the grains of superabrasive material and the particles to form a solid metal alloy having the grains of superabrasive material and the particles embedded therein, wherein infiltrating the grains of superabrasive material and the particles with the molten metal alloy comprises infiltrating the grains of superabrasive material and the particles at atmospheric pressure; and
   after forming the solid metal alloy, subjecting the solid metal alloy having the grains of superabrasive material and the particles embedded therein to a high pressure and high temperature process and forming inter-granular bonds between the grains of superabrasive material.

7. The method of claim 1, wherein depositing the at least two layers of material on the grains of superabrasive material in the chemical vapor infiltration process comprises forming a three-dimensional solid porous body comprising the grains of superabrasive material, the at least two layers of material deposited on the surfaces of the grains of superabrasive material, and the particles.

8. The method of claim 1, further comprising removing material from interstitial spaces between the inter-bonded grains of superabrasive material after subjecting the solid metal alloy having the grains of superabrasive material and the particles embedded therein to the high pressure and high temperature process.

9. The method of claim 1, wherein infiltrating the grains of superabrasive material and the particles with the molten metal alloy and solidifying the molten metal alloy within interstitial spaces between the grains of superabrasive material and the particles to form the solid metal alloy having the grains of superabrasive material and the particles embedded therein further comprises bonding a substrate to the solid metal alloy having the grains of superabrasive material and the particles embedded therein.

10. The method of claim 1, further comprising selecting the grains of superabrasive material to comprise diamond grains.

11. A method of forming a cutting element comprising a polycrystalline compact, comprising:
   depositing material on surfaces of grains of superabrasive material in a chemical vapor infiltration process and forming a three-dimensional solid porous body comprising the grains of superabrasive material bonded to one another by the material deposited on the surfaces of the grains of superabrasive material, wherein the grains of superabrasive material are free of inter-granular bonds directly between the grains of superabrasive material;
   disposing loose grains of superabrasive material over a substrate;
   disposing the three-dimensional solid porous body over the loose grains of superabrasive material such that the loose grains of superabrasive material are disposed between the three-dimensional solid porous body and the substrate; and
   subjecting the three-dimensional solid porous body, the loose grains of superabrasive material, and the substrate to a high pressure and high temperature process to form inter-granular bonds between the grains of superabrasive material.

12. The method of claim 11, further comprising infiltrating the three-dimensional solid porous body with a molten metal alloy at a temperature of about 1200° C. or less prior to subjecting the three-dimensional solid porous body to the high pressure and high temperature process to form inter-granular bonds between the grains of superabrasive material.

13. The method of claim 12, wherein infiltrating the three-dimensional solid porous body with the molten metal alloy at a temperature of about 1200° C. or less comprises infiltrating the three-dimensional solid porous body with at least one of a nickel alloy, a cobalt alloy, and an iron alloy.

14. The method of claim 12, wherein infiltrating the three-dimensional solid porous body with the molten metal alloy at a temperature of about 1200° C. or less further comprises infiltrating the three-dimensional solid porous body with the molten metal alloy at a pressure of about 500 MPa or less.

15. The method of claim 11, wherein subjecting the three-dimensional solid porous body, the loose grains of superabrasive material, and the substrate to the high pressure and high temperature process comprises subjecting the three-dimensional solid porous body, the loose grains of superabrasive material, and the substrate to a pressure of at least about 5.0 GPa and a temperature of at least about 1350° C.

16. The method of claim 11, wherein depositing material on the surfaces of the grains of superabrasive material comprises depositing at least one of a carbon based material, a carbide, a nitride, and a metal on the surfaces of the grains of superabrasive material.

17. The method of claim 11, further comprising mixing additional particles with the grains of superabrasive material prior to depositing material on the surfaces of the grains of superabrasive material.

18. The method of claim 11, further comprising removing material from interstitial spaces between inter-bonded grains of superabrasive material after subjecting the solid metal alloy having the grains of superabrasive material embedded therein to the high pressure and high temperature process.

19. The method of claim 11, further comprising selecting the grains of superabrasive material to comprise diamond grains.

20. A method of forming a cutting element comprising a polycrystalline compact for an earth-boring tool, comprising:
   depositing material on surfaces of grains of superabrasive material in a chemical vapor infiltration process and forming a three-dimensional solid porous body comprising the grains of superabrasive material bonded to one another by the material deposited on the surfaces of the grains of superabrasive material, wherein the grains of superabrasive material are free of inter-granular bonds directly between the grains of superabrasive material;

infiltrating the three-dimensional solid porous body with a molten metal alloy at a temperature of about 1200° C. or less and solidifying the molten metal alloy to provide a first metal alloy within pores of the three-dimensional solid porous body;

removing at least a portion of the first metal alloy from the pores of the three-dimensional solid porous body;

disposing loose grains of superabrasive material over a substrate;

disposing the three-dimensional solid porous body over the loose grains of superabrasive material such that the loose grains of superabrasive material are disposed between the three-dimensional solid porous body and the substrate; and subjecting the three-dimensional solid porous body, the loose grains of superabrasive material, and the substrate to a high pressure and high temperature process to form inter-granular bonds between the grains of superabrasive material after removing the at least a portion of the first metal alloy from the pores of the three-dimensional solid porous body, subjecting the three-dimensional solid porous body to a high pressure and high temperature process comprising providing a second metal alloy within interstitial spaces between inter-bonded grains of superabrasive material.

21. The method of claim 20, further comprising removing at least a portion of the second metal alloy from the interstitial spaces between the inter-bonded grains of superabrasive material after subjecting the three-dimensional solid porous body, the loose grains of superabrasive material, and the substrate to a high pressure and high temperature process.

22. The method of claim 20, wherein infiltrating the three-dimensional solid porous body with a molten metal alloy and solidifying the molten metal alloy to provide a first metal alloy within pores of the three-dimensional solid porous body further comprises bonding a substrate to the three-dimensional solid porous body and the first metal alloy within the pores of the three-dimensional solid porous body.

23. The method of claim 22, further comprising removing the substrate from the three-dimensional solid porous body and the first metal alloy within the pores of the three-dimensional solid porous body after removing the at least a portion of the first metal alloy from the pores of the three-dimensional solid porous body.

24. The method of claim 1, wherein mixing grains of superabrasive material with particles of a material comprises mixing grains of superabrasive material with particles of zirconium tungstate.

* * * * *